C. E. BRIGHT.
CUSHION ELEMENT FOR RESILIENT TIRES.
APPLICATION FILED JAN. 11, 1912.
1,081,426. Patented Dec. 16, 1913.
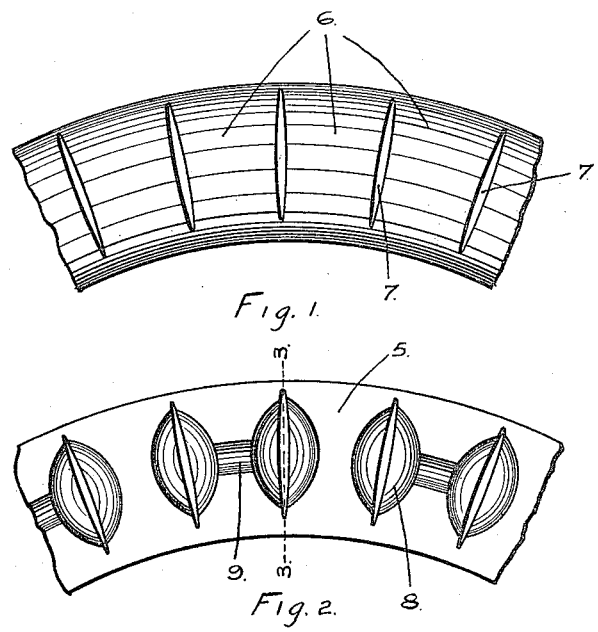
Fig. 1.
Fig. 2.
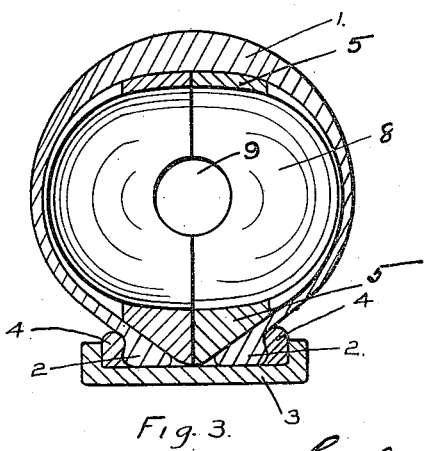
Fig. 3.
Inventor
Colonel E. Bright
Witnesses
H. M. Gillespie
A. L. Phelps
By
C. C. Shepherd
Attorney

UNITED STATES PATENT OFFICE.

COLONEL E. BRIGHT, OF COLUMBUS, OHIO.

CUSHION ELEMENT FOR RESILIENT TIRES.

1,081,426.     Specification of Letters Patent.     Patented Dec. 16, 1913.

Application filed January 11, 1912. Serial No. 670,665.

*To all whom it may concern:*

Be it known that I, COLONEL E. BRIGHT, a citizen of the United States, residing at Columbus, in the county of Franklin and State of Ohio, have invented certain new and useful Improvements in Cushion Elements for Resilient Tires, of which the following is a specification.

My invention pertains to cushion elements for resilient tires and is particularly designed to provide a structure of resilient tire which will equal the pneumatic tire in resiliency and which at the same time will be free from dangers and drawbacks incident to such pneumatic tires such as puncturing of the same.

My invention desirably takes the form of the structure shown in the appended drawings and it contemplates the provision of a central portion of a cushion element upon which are integrally formed wing members having their outer edges spaced apart and having their sides under-cut. Furthermore, I desirably provide interconnecting passages for the chambers formed by the opposing undercut surfaces and from such formation there results a continuous series of air cushioning actions.

The preferred embodiment of my invention is shown in the accompanying drawings, in which similar characters of reference designate corresponding parts, and in which—

Figure 1 is a side elevation of a section of my improved cushion element, Fig. 2 is a longitudinal section of the structure shown in Fig. 1, and, Fig. 3 is a section taken on line 3—3 of Fig. 2 with the shoe over the cushion element.

In the drawings, my cushion element is shown as embraced within a casing 1 having flanges 2 which are maintained within a rim 3 by clencher rings 4. The cushion element may best be described as having a central longitudinal rib or back-bone in the form of a main portion 5 having opposite wing members 6, which have their outer edges separated by slots 7 desirably of elliptical formation and having their side surfaces under-cut as at 8. These under-cut surfaces being opposite each other produce chambers of a substantially oval form as shown best in Fig. 2. The chambers are desirably connected by air passages 9 and the continual compression and expansion of the cushion element results in a continual play of the air between the connected chambers and through the passages. As a consequence, the effect of the resiliency of the tire is increased and aided by the air cushioning effect produced.

What I claim, is—

1. A cushion element for tires comprising a body portion provided with a plurality of chambers which are provided with passages between pairs, and with slotted openings through the lateral walls of said body portion.

2. A cushion element for tires comprising an annular body portion formed with spaced air chambers partially open, said open portions being elliptical slots in the side walls of said body portion and extending radially of said body portion.

3. A cushion element for tires comprising an annular body portion formed with spaced air chambers partially open and provided with longitudinal bores between certain of said chambers, said open portions being elliptical slots in the side walls of said body portion and extending radially of said body portion.

4. A cushion element for tires comprising a body portion having a longitudinal main piece, and wings having their outer edges separated by elliptical slots, said wings having their sides undercut and said main piece provided with longitudinal bores at intervals.

In testimony whereof I affix my signature in presence of two witnesses.

COLONEL E. BRIGHT.

Witnesses:
WALTER E. L. BOCK,
A. L. PHELPS.

---

Copies of this patent may be obtained for five cents each, by addressing the "Commissioner of Patents, Washington, D. C."